Figure 1:
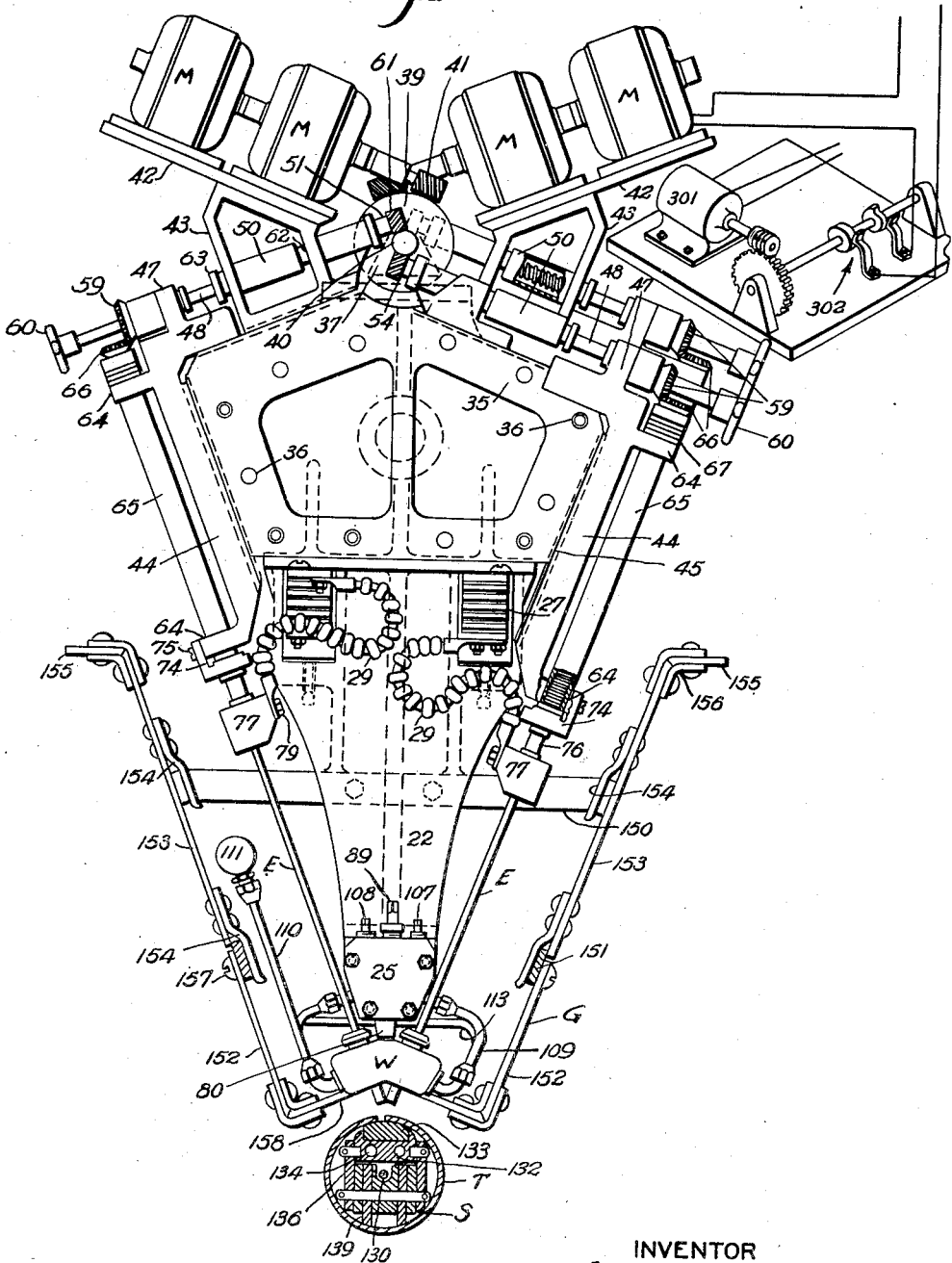

Feb. 6, 1940.   E. RIEMENSCHNEIDER   2,189,326
ARC WELDING SYSTEM
Filed Sept. 11, 1935   3 Sheets-Sheet 1

INVENTOR
ERNEST RIEMENSCHNEIDER
BY
Louis W. Nehmuth
ATTORNEY

Feb. 6, 1940. E. RIEMENSCHNEIDER 2,189,326
ARC WELDING SYSTEM
Filed Sept. 11, 1935 3 Sheets-Sheet 2
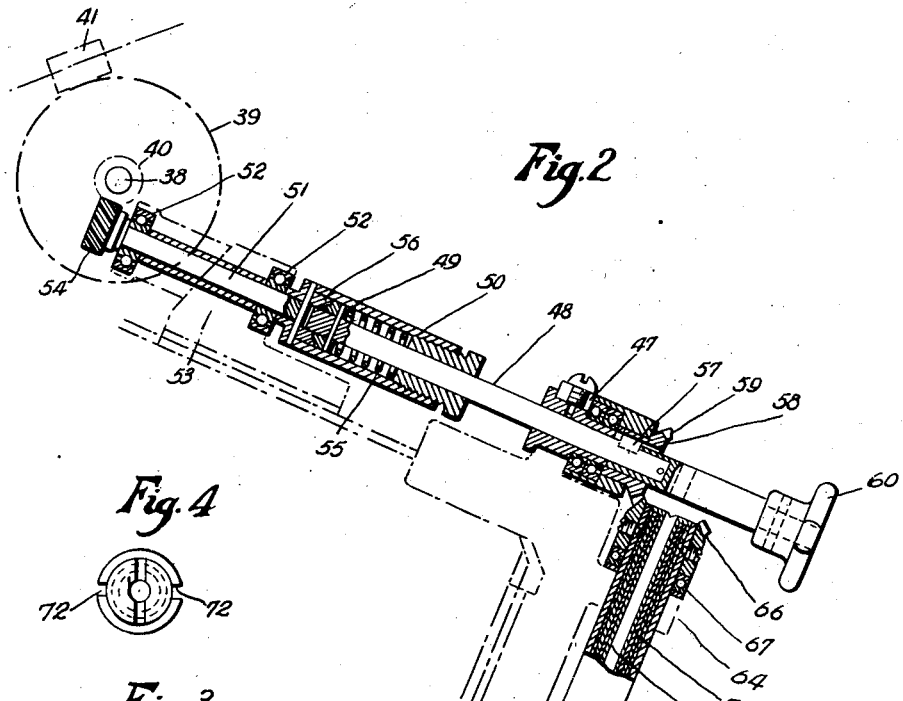
Fig.2
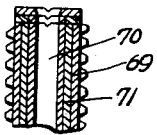
Fig.4
Fig.3
INVENTOR
ERNEST RIEMENSCHNEIDER
BY
ATTORNEY

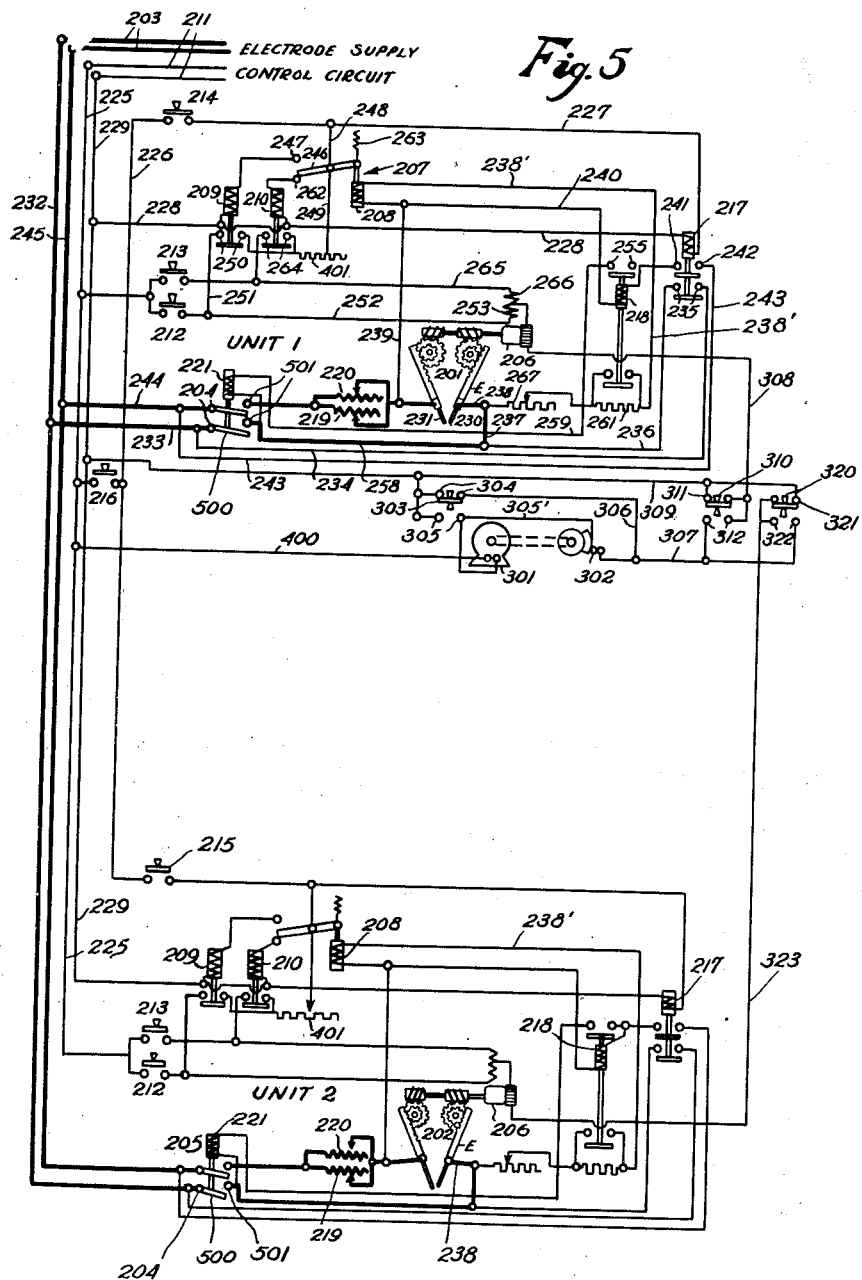

Patented Feb. 6, 1940

2,189,326

UNITED STATES PATENT OFFICE 2,189,326

ARC WELDING SYSTEM

Ernest Riemenschneider, Lakewood, Ohio, assignor to The Midland Steel Products Company, Cleveland, Ohio, a corporation of Ohio Application September 11, 1935, Serial No. 40,113

7 Claims. (Cl. 219—8)

This invention relates to new and useful improvements in arc welding systems and apparatus.

An important object of the invention is to provide means for establishing welding arcs and properly maintaining them in operation during welding.

Another important object of the invention is to provide flexible means for controlling a plurality of welding units.

In order to establish and maintain a proper arc during welding operations, each pair of electrodes are automatically fed by a motor toward or away from each other depending upon the voltage across the arc between the electrodes. The feed motor and circuits employed heretofore, adjusted these electrodes very rapidly, in fact, too rapidly, i. e., the momentum or inertia of the armature shaft usually carried the adjustment of the electrodes far beyond the proper spacing. This rapid movement of the electrodes back and forth and improper hydrogen adjustment frequently induces synchronous shifting of the molten globules on the ends of the electrodes to cause the arc to become very unstable. The prime object of this invention is, therefore to provide means which, during the operation of the unit, periodically interrupts the motor circuit so that the feed motor, when put in the control circuit, will intermittently start and stop at short intervals whereby the armature shaft will not gather momentum or inertia to carry the electrode adjustment beyond that which is desired and proper, but will feed the electrodes in or out in small increments of movement and will not induce unstability of the arc.

Another object of the invention is to provide a plurality of simultaneously and individually operable welding units, each possessing a pair of electrodes and an individual feed adjusting motor, and all of which are subject to the action of the aforesaid interrupter during welding operations, and means whereby the interrupting action for any one or more feed motors of the units may be temporarily cut out of operation or put in again. This is advantageous where all of the units are operating and the arc of one of them becomes extinguished. When this occurs, it is desirable to move the electrodes of the one disabled unit more rapidly than would occur with the interrupter working, so as to arrive at proper adjustment in a shorter interval of time and thereby reduce the loss of improperly welded pipe passing through the welding apparatus while the unit is disabled.

Another object of the invention is to provide means whereby a plurality of similar welding units can be simultaneously energized or any one or more may be individually energized or de-energized and any one or more operated to the exclusion of the others.

Other objects and advantages of the invention will become apparent during the course of the following description.

In the accompanying drawings forming a part of the description and wherein like numerals are employed to designate like parts throughout the several views;

Fig. 1 is an end elevation of a plurality of welding units showing the same in position for welding a tube section illustrated thereunder which is more fully described in my co-pending application, Serial No. 544,456 filed June 15, 1931, since matured into U. S. Letters Patent No. 2,061,671 granted November 24, 1936.

Fig. 2 is an enlarged elevation of an individual electrode feeding mechanism with parts thereof broken away and shown in section, Fig. 3 is an enlarged fragmentary section of the upper portion of an electrode holder, Fig. 4 is a top plan of the same, Fig. 5 is a wiring diagram of the electrical apparatus for operating the electrodes.

Referring particularly to the mechanical apparatus illustrated in Figs. 1 and 2, it will be noted that it is shown disposed above tubing T or other metal parts to be welded. A plurality of these individual welding units, the wiring diagram for a pair of the same being illustrated in Fig. 5, are suspended from end pieces 22, vertically and horizontally adjustably mounted above the tubing. These end pieces 22 support a plurality of individual supporting frames 35 by means of tie rods or bolts 36 extending through the entire set of frames. Each of the frames 35 is provided on one face at approximately the four corners thereof with tubular dowels as shown, for assisting in aligning the different frames when assembling.

The two end pieces 22 have secured to their upper ends, bearings 37 for a shaft 38 extending longitudinally above the entire series of frames 35.

For each frame 35, there is mounted on the shaft 38, a worm gear unit comprising a relatively large worm wheel 39 and a relatively small worm wheel 40, each unit being individually rotable upon the shaft for the individual control of the pair of electrodes E associated with that frame. The larger worm wheel 39 meshes with a worm 41 carried by the armature shaft of a reversible electric motor M, which drives the individual worm unit above described. As more clearly shown in my co-pending application, these motors are arranged in staggered relationship on opposite sides of the shaft 38 and in more or less nested relationship whereby they may be arranged in a restricted area essential for the close relationship necessary for the various welding units. Thus, it will be seen that the armature shafts of alternate motors are extended between the motor housings of adjacent motors to assist in providing for the necessary compact relationship. The motors on each side of the shaft 38 are mounted on an inclined platform 42, supported by brackets 43, fastened to the tops of frames 35. Preferably, the brackets 43 are provided with keyways slidable upon the inclined keys on tops of the frames 35 and may therefore be secured in the desired relationship by any suitable means.

As will be appreciated from Figs. 1 and 2, removable electrode holder bearings 44 of inverted L shape, are supported by keys 45, along the downwardly and inwardly inclined sides of each frame 35, the angularly disposed upper portions of each bracket overlapping the top of its individual frame 35 as shown. The upper angular ends of the brackets 44 which overlap the frames 35 are each equipped with a bearing portion 47 for the support of one end of a shaft 48, the other end of which is keyed to a clutch element 49, rotatably mounted in a clutch sleeve 50 secured to one end of shaft 51. This shaft is mounted in anti-friction bearings 52, carried by a bearing 53 splined to the top of a frame 35 as best illustrated in Fig. 2. A worm 54 is keyed to the shaft 51 to mesh with the small worm wheel 40 carried by the worm unit at the center of the unit. Surrounding the shaft 48 within the clutch housing 50, is a coil spring 55 normally tending to hold the clutch element 49 engaged with the female clutch element 56 to impart the drive from the shaft 51 to shaft 48. The outer end of the shaft 48 is provided with a key 57, operating in keyway 58 of a bevel gear 59, in order to rotate the latter with the shaft upon rotary movement of the latter and to permit longitudinal sliding movement of shaft 48 within the gear when the hand knob 60 of this shaft is pulled outwardly, thereby compressing the springs 55 and disengaging the clutch elements 49 and 56. In this position of the parts, rotation of the shaft 48 by means of the handle 60 will cause corresponding rotation of the gear 59 without rotating the shaft section 51. This provision is made for manual adjustments of the electrodes E as will be presently described.

As will be recalled, there is provided a worm unit 40 for each pair of electrodes, one of the latter being adjusted automatically by rotation of the worm 54 engaging the lower side of the worm 40 while the other electrode is automatically adjusted by means of worm 61 engaging the worm 40 at a point substantially diametrically opposite the point where the worm 54 engages. This worm 61 is keyed to a shaft 51 corresponding to that already described, which projects through bearings 62 and 63 carried by the bracket 43 and between the legs of which is provided a clutch casing 50 corresponding to the one just described. This clutch, as on the opposite side of the frame couples a shaft 48 with the drive shaft 51 for rotating gear 59. This shaft 48 is extended out on the opposite side of the machine to terminate in hand knob 60 for declutching the drive shaft while manually adjustments are made to the electrode on that side of the machine.

The electrode holder brackets 44 are the same for both sides of the apparatus and therefore a description of one will suffice for both. Each bracket is provided with a pair of outwardly extending spaced bearings 64 for rotatably receiving an electrode holder sleeve 65. The upper end of this sleeve has keyed thereto a beveled gear 66, adapted for constant mesh with its companion gear 59. The gear 66 rests upon an anti-friction bearing 67 supported upon the upper surface of the upper bearing 64. The lower end of each sleeve 65, has a bronze nut 68, brazed or otherwise secured thereto and is extended through the lower bearing 64. Within this nut is adapted to operate a tubular screw 69 extending through the sleeve 65. Within the tubular screw is rigidly mounted an electrode holding sheath 70 which is electrically insulated from the inner surface of the tubular screw by means of an elongated sleeve 71 of insulating material.

In order to cause longitudinal movement of the tubular screw 69 upon rotation of the holder sleeve 65 in either direction, the screw is provided with a pair of diametrically disposed longitudinally extending keys 72 (see Fig. 4) for slidably receiving a pair of keys 73 carried on a bearing bracket 74, floated on the lower bearing 64 by a shouldered screw 75. The electrode sheath 70 extends beyond the lower end of screw 69 and through an electrically insulated spacer bushing 76 and conductor head 77, where it is secured therein to make firm electrical contact by a pair of set screws 78. This conductor head is preferably of copper and has attached by means of bolts 79 the end of one of the armored conductors 29, whereby to cause conduction of electrical energy from one of the laminated buss bars 27. As will be later described the electrodes E are caused to be adjusted up or down during the operation of the device, according to arc voltage, by the reversible motors M so as to maintain a proper gap between each pair of tungsten electrodes.

A hydrogen gas control body 25 is supported by the end pieces 22 and suspends a welding head or electrode chamber W by means of a plurality of depending hydrogen nozzles 80 in a position whereby the downwardly converging electrodes E extend therethrough as shown, to be disposed above the seam in the tubing T. A stem 89 extending through the gas control body 25 for each unit divides the hydrogen conduit into two passages, one controlled and regulated by needle valve 107 and the other by needle valve 108 to vary the quantity of hydrogen supplied to the electrodes, as more fully described in my aforesaid co-pending application. This gas control body 25 and welding head W are water cooled with pipes 110, 111 and 113, as fully disclosed in my copending application.

As disclosed in the aforesaid copending application, the welding shoe 132 is provided with a heat resisting bar 133 positioned within the tubing T. This shoe is also provided with water passages 134 for the circulation of a cooling medium. A plurality of links 136 are pivotally connected to the sides of the shoe and the lower ends of these links are pivotally connected to a carriage having a plurality of pairs of rollers 139 having peripheries contoured to fit the inner surface of the tubing so as to form a substantial support for the shoe without marring the tubing.

In order to protect the welding apparatus from intense heat created by the multiple welding units, a heat insulating shield or guard G is interposed between the tubing being welded and the apparatus. For supporting this heat shield, a pair of vertically spaced supporting bars 150 and 151 are secured to the end pieces 22 and have their ends bent parallel to the control body 25 as shown. The heat insulating guard is made in two sections 152 and secured to the lower supporting bar 151 on frame and upper sections 153 provided with vertically spaced downwardly opening clips or hooks 154 adapted to detachably clasp the upper and lower bars 150 and 151. Accordingly, it will be obvious that the upper guard sections 153 can be removed by simply raising them sufficiently to disengage the clips 154 from the supporting bars, thereby giving ready access to the welding unit. Preferably the upper ends of the sections 153 are deflected outwardly as at 155 and are suitably reinforced at the angles thereof with angle cleats 156. The lower sections 152 of the guard are secured at each side of the apparatus to the lower supporting bar 151 by means of screws 157. The lower ends 158 of these sections are bent inwardly to engage the welding head W as shown and if desired, may be permanently attached thereto in any suitable manner. This sectional heat insulating guard is preferably formed of heat insulating material and the sides of the same are arranged in downwardly converging relationship as shown to conform with the general configuration of the apparatus. For further details of the construction of the welding units, reference is respectfully invited to applicant's aforesaid copending application.

In addition, where a plurality of welding units are employed, it is impossible for the operator to rapidly make the requisite adjustments manually at the same time. It is for these reasons that provision is made for intermittently supplying current to the motors M which are designated by the numerals 206 in Fig. 5 to prevent these motors from gathering inertia and causing the electrodes to be adjusted too far beyond the proper arcing distance one way or the other. As a result, proper electrode adjustment will be attained more rapidly and this is extremely impotant during the welding operation so as to reduce the loss of improperly welded tubing during the time any one or more welding units are out of adjustment or their arcs extinguished.

While any number of welding units may be hooked up in multiple for the welding operation, two of such welding units 1 and 2 are illustrated in the wiring diagram of Fig. 5. Unit No. 1 is connected to a source of supply 203 by means of a switch 204 and unit No. 2 is connected to the same source of supply by means of a switch 205. Each unit is controlled by an automatic electrode feeding means including a feed motor M as in Fig. 1 or 206 as in Fig. 5 operating feed mechanism 201. The direction of rotation of this motor is controlled by voltage control regulator 207, the operating coil 208 of which is connected across the electrodes so as to be responsive to arc voltage. This regulator operates either relay 209 or 210 to complete connections to a control circuit 211 by means of which the feed motor 206 is rotated in the proper direction to feed the electrodes toward or away from one another to strike and thereafter maintain a welding arc between them. The rotation of the feed motor may also be controlled by means of manually operable switches 212 and 213. Provided switches 214 and 215 are closed, units 1 and 2 may be simultaneously energized or de-energized by the operation of a switch 216. In order to operate motors 206 individually or simultaneously at intervals, a continuously operable motor 301 operates an interrupter 302. This means for interrupting the feed motor circuits of all of the units may be of any desired type but is here shown in the form of a motor driven cam operated switch 302.

As explained hereinbefore, the feed motors 206 gain inertia very rapidly which is advantageous in first starting the apparatus to cause rapid establishment of the arcs, but once they are established, the operation of these feed motors should be modified so that they will not thereafter and during the welding operations, cause the adjustment of the electrodes by such large increments of movement. This is accomplished by providing suitable means for intermittently interrupting the feed motor circuit with any suitable means and whenever desired; such interrupter means serving for the entire series of units, as will be presently described.

The system illustrated will be better understood from a consideration of its operations. In order to start the operation of electrodes of unit No. 1, switches 216 and 214 are closed. This completes the energizing circuit for relay 217 through the following circuit: From one conductor of the control circuit 211 through conductor 225, switch 216, conductor 226, switch 214, conductor 227, the operating coil of switch 217, and conductors 228 and 229 to the other conductor of the control circuit 211. The closing of switch 217 closes contacts 242 and 235 completing circuit for operating the voltage control relay coil 208 through the following circuit: For operating voltage control relay coil 208 from the electrode supply 203, the circuit is through conductors 232, 233, 234 into contact 235, thence through conductors 236, 237 and 238 through variable resistance 267 and resistance 261, conductors 238' to coil 208, back through conductor 240 through high impedance coil 218, contacts 241 and 242, conductors 243, 244 and 245 thence back to supply 203. Energization of coil 208 operates relay arm 246 to close contact 247 which energizes the circuit of relay coil 209 and closes contacts 250 so that current passes from conductor 227 into 248, relay arm 246, contact 247, relay coil 209, conductors 228 and 229, which completes a feed motor circuit from conductor 227 through 248 and 249, variable resistance 401, contacts 250 into conductors 251 and 252, thence into the series field coil 253 of motor 206 and thence through the armature of motor 206 to conductor 308 and thence through switch 310 and contacts 311 back through the conductor 309 to 229 of the control circuit. This return is through conductor 309, which is part of an interrupter circuit to be presently described. Completion of this circuit through the field 253 of a reversible motor 206 causes the latter to feed the electrodes 230 and 231 down toward one another or to make contact.

It will be noted that when the relay 209 is closed the variable resistance 401 is immediately inserted in the field 253 of the feed motor circuit to reduce the speed of rotation of the feed motor armature and thus the speed at which the electrodes 230 and 231 approach each other. With this arrangement of the resistance 401, the speed of approachment of the electrodes 230 and 231 is so reduced that they do not "freeze" or adhere to each other when they come into engagement. The resistance 401 is inserted in the field 253 of the feed motor prior to closure of the switch 221 which inserts the low impedance 219 and 220 in the electrode circuit to increase the value of the current flowing through the electrodes 230 and 231. Accordingly, it will be seen that the resistance 401 is controlled by the relays 209 and 210 and that it reduces the speed of approachment of the electrodes 230 and 231 and that the engagement of the electrodes occurs prior to closure of the switch 221 to increase the value of current flow in the electrodes 230 and 231. The resistance 401 is also inserted in the field 266 of the feed motor when the relay 210 is closed, accordingly the speed of separation of the electrodes 230 and 231 is reduced.

The electrodes upon making contact with one another complete an energizing circuit for coil 218 from the electrode supply 203, conductors 232, 233 and 234, contacts 235, conductors 236, 237 and 238, electrodes 230 and 231 of unit No. 1, thence through conductors 239 and 240, coil 218, contacts 241 and 242, and conductors 243, 244 and 245; which causes coil 218 to close contacts 255 thereby completing the circuit for coil 221 as follows: Electrode supply 203, conductors 232, 233, 234, contacts 235, conductors 236 and 258, coil 221, through conductor 259, contacts 255, contacts 241 and 242 to conductors 243, 244 and 245 back to the electrode supply 203.

Energization of coil 221 moves the switch arms 500 simultaneously into engagement with contacts 501 to complete the electrode supply circuit from 203, conductors 232 and 233 to the lower contacts 204 and 501, thence through conductors 258, 237 and 238 through the electrodes 230 and 231 and back through one or more variable low impedance coils 219 and 220 to the upper contacts 501 and 204 back through conductors 244, 245 and into the supply 203. Completion of the foregoing circuit causes de-energization of coil 208 permitting spring 263 to move relay arm 246 down to make contact with 262 completing the circuit for coil 210. Energization of coil 210 closes contacts 264 thereby completing the motor circuit for field coil 266 from conductors 227, 248, 249, variable resistance 401, contacts 264 into conductor 265 and thence through the series field 266, through armature of motor 206 and thence through conductor 308, contacts 311 of switch 310 to the conductor 309 and thence into conductors 229 and 211 of the control circuit. This causes the motor feed to begin operating the electrodes to break the arc therebetween and create a voltage drop between these electrodes. The control coil 208 having been set to maintain a predetermined voltage across the electrodes, stands guard to move the arm 246 one way or the other to make contacts 247 or 262 depending upon such voltage and thereby energize one field or the other of the reversible motor 206 to cause adjustment of the electrodes to maintain a proper welding arc as hereinbefore recited.

When this predetermined adjustment of the electrodes has been attained to form a proper welding arc, it is desirable to maintain this arc and to prevent the subsequent electrode adjustment from going too far one way or the other. This is accomplished by the use of an interrupter circuit connected to each of the feed motor circuits. For this purpose a variable speed interrupter motor 301 driving an interrupter 302 is connected by conductors 400 and 225 to the control circuit 211 whereby the frequency of impulses given to the feed motor circuits can be increased or decreased. A control switch 303 for this motor has two pairs of contacts 304 and 305. One of the contacts 304 is connected with conductor 309 leading to the control circuit 211, and the other contact 304 is connected by conductor 306 with the interrupter side 307 of the circuit. One of the contacts 305 is connected with the conductor 309 and the other is connected to the motor as well as with a conductor 305' leading to one contact arm of the interrupter. With the switch 303 in the position illustrated engaging contacts 304, the interrupter motor 301 is idle and cut out of the feed motor circuit so that the feed motor 206 is not influenced by the interrupter motor. With the switch 303 engaging contacts 305, the interrupter motor circuit is completed through conductors 400 and 309 and motor 301 starts operating.

In order that the interrupter motor may be thrown in or out of the feed motor circuit of Unit 1 at the will of the operator the switch 310 is provided with a pair of contacts 311, one connected with conductor 308 and the other with conductor 309. A second pair of contacts 312 is provided for switch 310, one contact 312 being connected with conductor 307 and the other with conductor 308.

With the switches 310 and 303 in the positions illustrated engaging contacts 311 and 304 respectively, the interrupter motor 301 is idle and the feed motor 206 operates without the influence of interrupter 302. With the switch 310 engaging contacts 312 the contactor side of the interrupter circuit is connected with the motor control circuit, and when the switch 303 engages contacts 305, the interrupter motor is started and is cut into the feed motor circuit through conductor 308, contacts 312, conductor 307, contactor 302, through contacts 305, then into conductor 309 back to the control circuit thereby causing electrodes 230 and 231 to be moved in small increments of movement whenever the feed motor 206 operates. Should the operator throw the switch 303 into engagement with contacts 304, without operating switch 310, to disengage contacts 312, the interrupter motor will stop and will be cut out of the feed motor circuit while the feed motor 206 will be left in circuit through conductor 308, contacts 312, conductors 306 and 307, contacts 304 into conductor 309.

A switch 320 identical with switch 310 is provided for the control of the interrupter in Unit 2 of the welding equipment and has a pair of contacts 321, one of which is connected with conductor 309. Another pair of contacts 322 is provided for this switch 320. A conductor 323 is connected with one contact 322 and to the contact 321 not connected with conductor 309. The other contact 322 is connected to conductor 307, so that when the contacts 322 are engaged by the switch 320, the feed motor 206 of the second unit is connected with the interrupter motor circuit 309. However, when the switch 320 engages contacts 322, the feed motor 206 of the second unit is cut into the interrupter side 307 of the interrupter motor circuit so that this feed motor is subject to the control of the interrupter whereby the electrodes E of the second unit are adjusted in small increments of movement. Of course, for every additional welding unit added to the series, a separate control switch similar to 320 is incorporated.

In starting the operation of the units, it is desirable that the feed motors move the electrodes rapidly at first and then when the electrodes approach one another closely or have once engaged one another, the interrupter is cut into the feed motor circuit so that the electrodes are then given only slight increments of movement one way or the other so as to establish their proper spacing for their most efficient operation without being adjusted too far one way or the other. To accomplish this, the switches 310 and 320 are preferably arranged to engage their respective contacts 312 and 322, so that when the switch 303 is engaged with its contacts 305, the interrupting action of motor 301 will cause intermittent operation of the feed motors 206 of all units.

The control of the unit 202 is identical with the control described above for Unit 1. It will be noted however, that the two control systems are connected to one another by a master switch 216, so that if the switches 214 and 215 are closed both units may be started or stopped at the same time by the operation of switch 216. After switch 216 has been operated, either unit may be de-energized by opening switches 214 or 215. The operation and direction of rotation of each of the feed motors associated with each unit is also under the control of manual switches 212 and 213 by means of which the electrodes can be adjusted relative to one another when the unit is not in operation and under control of the automatic regulator associated therewith. Thus, by closing switch 212, the feed motor may be caused to rotate in the proper direction to feed the electrodes together and by closing switch 213, the feed motor may be made to rotate in the opposite direction to feed the electrodes away from one another.

In the system illustrated and described, only two welding units have been illustrated. It is of course apparent that one or any number of units may be employed in accordance with the teachings of my invention. This invention is particularly applicable to the apparatus employing a plurality of welding units which may work on the same article or a plurality of articles at the same time. The invention is not limited to units of the particular construction represented in the drawings, since it may be used in metallic arc welding or with a tornado arc, since the welding arc may be established between the electrode and work which constitutes a cooperating electrode. In the particular arrangement illustrated, the voltage across the electrodes has been used for controlling the feeding of the electrodes toward and away from one another. It is of course apparent that this feeding operation may be under the control of the welding current, or any other characteristic of the welding circuit including the electrode. It will also be obvious that interrupters of other forms than that disclosed herein may be employed for compelling intermittent feeding by the feed motors. It will also be understood that the invention can be employed wherever adjustment of parts is required and is not to be limited to welding apparatus.

Having thus described the invention, what I claim is new and I desire to secure Letters Patent:

I claim:

1. An arc welding system comprising a welding circuit including an adjustable electrode, a control circuit including a reversible motor and a voltage control relay switch mechanism to operate the motor in a direction dependent upon electrical characteristics of the welding circuit to adjust said electrode, means for intermittently interrupting the control circuit at regular periodic intervals whereby the motor is operated intermittently, and means for cutting the interrupting means into and out of the control circuit.

2. An arc welding system comprising a welding circuit including a pair of adjustable electrodes, a control circuit therefor including a reversible electric motor to adjust the spacing of the electrodes for proper arcing therebetween, electric switches to control the motor circuit to operate the motor in either direction to adjust said electrodes, and independently operated interrupter means connected to the control circuit for causing intermittent operation of said motor.

3. An arc welding system comprising a welding circuit including a pair of adjustable electrodes, a control circuit therefor including a reversible electric motor to adjust the spacing of the electrodes for proper arcing therebetween, electric switches to control the motor circuit to operate the motor in either direction to adjust said electrodes, and independently operated interrupter means connected to the control circuit for causing intermittent operation of said motor, and means whereby the interrupter influence upon the control circuit may be made selectively effective.

4. An arc welding system comprising a welding circuit including an adjustable electrode, a control circuit including a reversible motor to adjust the electrode, means to control the direction of operation of the motor, interrupter means non-responsive to the electrical characteristic of the welding arc connected to said control circuit, and means for optionally cutting the interrupter means into and out of the control circuit whereby when it is cut into said circuit it causes intermittent operation of the motor to adjust the electrode in small increments of movement.

5. An arc welding system comprising a welding circuit including an adjustable electrode, a control circuit including a reversible motor and a voltage control relay switch mechanism to automatically operate the motor in a direction dependent upon the electrical characteristics of the welding arc to adjust said electrode, manually operated switches in said control circuit to operate the motor in a direction to adjust said electrodes, and means non-responsive to the electrical characteristic of the welding arc for intermittently interrupting the control circuit whereby the motor is operated intermittently to adjust the electrode in small increments of movement.

6. An arc welding system comprising a plurality of welding units each including a welding circuit and an adjustable electrode, a control circuit for each unit including a reversible motor to operate in directions to adjust the electrode, interrupter means connected to the control circuits for the plurality of units, and means for cutting the interrupter means into and out of any one or more of the control circuits.

7. An arc welding system comprising a plurality of welding units each including a welding circuit and an adjustable electrode, a control circuit for each unit including a reversible motor to adjust the electrode, interrupter means connected to the control circuits for the plurality of units and being normally electrically disconnected from said circuits, master switch means for partially electrically connecting the interrupter means with all of said control circuits, and auxiliary switch means for completing the electrical connection of any one or more of the control circuits of the units with the interrupter means to cause any one or more of the electrodes to be adjusted in small increments of movement.

ERNEST RIEMENSCHNEIDER.